US011507062B2

(12) United States Patent
Uchida

(10) Patent No.: US 11,507,062 B2
(45) Date of Patent: Nov. 22, 2022

(54) NUMERICAL CONTROL APPARATUS

(71) Applicant: OKUMA Corporation, Aichi (JP)

(72) Inventor: Yuji Uchida, Aichi (JP)

(73) Assignee: OKUMA CORPORATION, Aichi (JP)

(*) Notice: Subject to any disclaimer, the term of this patent is extended or adjusted under 35 U.S.C. 154(b) by 396 days.

(21) Appl. No.: 16/694,131

(22) Filed: Nov. 25, 2019

(65) Prior Publication Data
US 2020/0166910 A1 May 28, 2020

(30) Foreign Application Priority Data

Nov. 26, 2018 (JP) .............................. JP2018-220621

(51) Int. Cl.
G05B 19/416 (2006.01)
G05B 19/18 (2006.01)
G06N 20/00 (2019.01)

(52) U.S. Cl.
CPC ....... *G05B 19/4166* (2013.01); *G05B 19/182* (2013.01); *G06N 20/00* (2019.01)

(58) Field of Classification Search
CPC .............. G05B 19/4166; G05B 19/182; G05B 2219/34391; G05B 19/416; G05B 2219/32383; G06N 20/00
See application file for complete search history.

(56) References Cited

U.S. PATENT DOCUMENTS 6,647,353 B2* 11/2003 Fujibayashi ......... G05B 19/416
702/152
11,029,650 B2* 6/2021 Tsuneki ................ G05B 19/19
(Continued)

FOREIGN PATENT DOCUMENTS

JP 5118232 B2 1/2013
JP 5152443 B1 2/2013
(Continued)

OTHER PUBLICATIONS

JPO Notice of Reasons for Refusal for corresponding JP Application No. 2018-220621; dated May 10, 2022.

Primary Examiner — Kenneth M Lo
Assistant Examiner — Olvin Lopez Alvarez
(74) Attorney, Agent, or Firm — Cantor Colburn LLP

(57) ABSTRACT

A numerical control apparatus of a machine tool that performs tapping, includes a numerical control, an acceleration learning block, an acceleration/deceleration processing unit that applies an acceleration/deceleration process to the command acceleration and the position command value to calculate a post-acceleration/deceleration position command value, a position control unit that calculates a speed command value based on the post-acceleration/deceleration position command value, a speed/torque control unit that calculates a motor torque command value from the speed command value, and a current control unit that calculates a motor current value of a spindle motor from the motor torque command value. The acceleration learning block outputs, as the command acceleration A, an initial command acceleration A[0] which is smaller than the calculated command acceleration, in accordance with a state quantity of the spindle motor, to the acceleration/deceleration processing unit.

8 Claims, 3 Drawing Sheets

(56) References Cited

U.S. PATENT DOCUMENTS

| | | | |
|---|---|---|---|
| 2008/0218116 A1* | 9/2008 | Maeda | G05B 19/19 318/632 |
| 2010/0148714 A1* | 6/2010 | Okita | G05B 19/404 318/561 |
| 2012/0296475 A1 | 11/2012 | Maekawa et al. | |
| 2013/0234643 A1* | 9/2013 | Shibata | G05B 19/00 318/639 |
| 2015/0081084 A1 | 3/2015 | Nishiwaki et al. | |
| 2016/0048116 A1* | 2/2016 | Imada | H02P 6/34 318/567 |
| 2016/0116909 A1 | 4/2016 | Morita et al. | |
| 2016/0291580 A1* | 10/2016 | Morita | G05B 19/416 |
| 2016/0297043 A1* | 10/2016 | Inaguchi | B23Q 3/157 |
| 2018/0239328 A1 | 8/2018 | Oikawa et al. | |

FOREIGN PATENT DOCUMENTS

| | | |
|---|---|---|
| JP | 6001633 B2 | 10/2016 |
| JP | 2018134709 A | 8/2018 |

* cited by examiner

NUMERICAL CONTROL APPARATUS

CROSS REFERENCE TO RELATED APPLICATION

The present invention claims priority under 35 U.S.C. § 119 to Japanese Patent Application No. 2018-220621 filed on Nov. 26, 2018, which is incorporated herein by reference in its entirety including the specification, claims, drawings, and abstract.

TECHNICAL FIELD

The present disclosure relates to a numerical control apparatus for a machine tool, and more particularly to a numerical control apparatus for a machine tool that performs tapping with a spindle and a feed axis being synchronized with each other.

BACKGROUND

In machine tools that perform tapping with a spindle and a feed axis maintained in synchronism with each other, methods for high-speed and high-precision machining have been proposed. JP 6001633 B, for example, proposes, in the specification, a method for accelerating or decelerating a spindle using a drive source to its maximum performance, thereby shortening the machining time. This method accomplishes high-speed and high-precision machining by switching control between speed control during a period in which the maximum performance of the drive source is used and position control during a period in which positioning in a hole bottom is required. JP 5152443 B further proposes, in the specification, achieving high speed and high precision by determining acceleration from a toque obtained by subtracting a cutting torque based on the tapping tool diameter from the maximum torque of the spindle motor, and further performing acceleration learning such that synchronization errors monitored during machining fall within allowable values.

JP 5118232 B further proposes, in the specification, prestoring, in a ratio memory unit, a ratio for changing acceleration of a spindle in accordance with the temperature of a spindle motor that drives the spindle, and computing the acceleration of the spindle based on the detected temperature of the spindle motor and the ratio stored in the ratio memory unit.

SUMMARY

However, as the acceleration differs between a feeding process and a returning process during tapping, the related art method described in JP 6001633 B may suffer from a feed/return error caused by a tracking error and may fail to achieve high precision defined as the first-level precision in the Japanese Industrial Standards (JIS).

In this regard, the related art method described in JP 5152443 B is unlikely to suffer from a feed/return error caused by a tracking error because the acceleration remains the same all through the tapping process. This method further shortens the machining time by obtaining an acceleration torque by subtracting a cutting torque determined from the tap diameter from the maximum torque in the specification of the motor, and determining the acceleration for driving the spindle from the acceleration torque. However, the maximum toque of an induction motor, which is typically employed for the spindle, increases or decreases depending on its driving state, driving history, winding temperature, and other conditions. The related art method described in JP 5152443 B fails to consider the above features of induction motors. Therefore, according to this method, it is not possible to drive the spindle with the determined acceleration when the maximum torque of the spindle motor is decreased, which results in an increase in the synchronization error between the spindle and the feed axis. This further lowers precision of tapping in that cycle, and may stop the spindle with an excessive synchronization error alarm.

In the related art method disclosed in the specification of JP 5152443 B, for example, if the field current is not sufficient and the magnetic flux is not stable in driving an induction motor in an unenergized state, such as in starting machining in an unenergized state, or if the secondary resistance identified value, which is a circuit constant of an induction motor, significantly deviates from the optimal value, as in a case where machining is resumed with the spindle motor having a lowered temperature after some time elapsed from completion of machining, the outputtable maximum torque may decrease to increase the synchronization error between the spindle and the feed axis, thereby increasing the machining error.

The related art method disclosed in the specification of JP 5118232 A calculates acceleration of the spindle based on detected temperatures of the spindle motor to control revolution of the spindle. However, when the field current is not sufficient and the magnetic flux is not stable, or when the secondary resistance identified value significantly deviates from the optimal value, a decrease in the maximum torque may prohibit the spindle motor from following the control even if the acceleration of the spindle motor is determined based on the temperature of the spindle motor. This results in an increase in the synchronization error between the spindle and the feed axis, which may further increase the machining error.

An embodiment of the disclosure is therefore aimed at providing a numerical control apparatus that reduces machining errors of a machine tool that performs tapping with a spindle and a feed axis being synchronized with each other.

In accordance with an aspect of the disclosure, a numerical control apparatus for a machine tool that performs tapping with a spindle and a feed axis being synchronized with each other, includes a numerical control unit that interprets a tapping program and outputs a position command value of the spindle, an acceleration learning block that calculates and outputs a command acceleration of the spindle during tapping, an acceleration/deceleration processing unit that applies an acceleration/deceleration process to the position command value input from the numerical control unit based on the command acceleration input from the acceleration learning block to calculate a post-acceleration/deceleration position command value, a position control unit that calculates a speed command value based on the post-acceleration/deceleration position command value input from the acceleration/deceleration processing unit, a speed/torque control unit that calculates a motor torque command value from the speed command value input from the position control unit; and a current control unit that calculates a motor current value of a spindle motor from the motor torque command value input from the speed/torque control unit. The acceleration learning block outputs, as the command acceleration, an initial command acceleration which is smaller than the command acceleration which is calculated, in accordance with a state quantity of the spindle motor, to the acceleration/deceleration processing unit.

As described above, the acceleration learning block outputs, as a command acceleration, the initial command acceleration which is smaller than the calculated command acceleration to the acceleration/deceleration processing unit, in accordance with the state quantity of the spindle motor. It is therefore possible to inhibit input of large command acceleration to the acceleration/deceleration processing unit when the outputtable maximum torque of the spindle motor is decreased. This structure inhibits an increase in the synchronization error between the spindle and the feed axis, which further causes an increase in the machining error, even when the maximum torque of the spindle motor decreases to prevent the spindle motor from following the control.

In the numerical control apparatus, the state quantity of the spindle motor may be the motor current value calculated by the current control unit, and the acceleration learning block may output, as the command acceleration, the initial command acceleration to the acceleration/deceleration processing unit, when the motor current value is 0.

When the motor current value is 0, the acceleration learning block outputs, as a command acceleration, the initial command acceleration to the acceleration/deceleration processing unit. This structure inhibits input of large command acceleration to the acceleration/deceleration processing unit when the field current is insufficient and the magnetic flux is not stable to thereby decrease the outputtable maximum torque in driving the spindle motor in an unenergized state such as when starting machining from an unenergized state. This further inhibits an increase in the synchronization error and an increase in the machining error.

In the numerical control apparatus, the state quantity of the spindle motor may be a secondary resistance identified value of the spindle motor calculated by the current control unit, and the acceleration learning block may output, as the command acceleration, the initial command acceleration to the acceleration/deceleration processing unit, when the secondary resistance identified value is equal to or greater than a predetermined threshold value.

When the secondary resistance identified value is equal to or greater than the predetermined threshold value, the acceleration learning block outputs, as a command acceleration, the initial command acceleration to the acceleration/deceleration processing unit. This structure inhibits input of large command acceleration to the acceleration/deceleration processing unit when the secondary resistance identified value, which is a circuit constant of the spindle motor, significantly deviates from the optimal value to decrease the outputtable maximum torque, such as when resuming machining in a state where the temperature of the spindle motor is lowered. This further inhibits an increase in the synchronization error and an increase in the machining error.

The present disclosure provides a numerical control apparatus capable of reducing a machining error of a machine tool that performs tapping with a spindle and a feed axis being synchronized with each other.

BRIEF DESCRIPTION OF DRAWINGS

Embodiment(s) of the present disclosure will be described by reference to the following figures, wherein.

DESCRIPTION OF EMBODIMENTS

The structure of a numerical control apparatus 100 according to an embodiment will be described by reference to the drawings. The numerical control apparatus 100 is used for a machine tool that performs tapping with a spindle and a feed axis being synchronized with each other.

Figure 1:
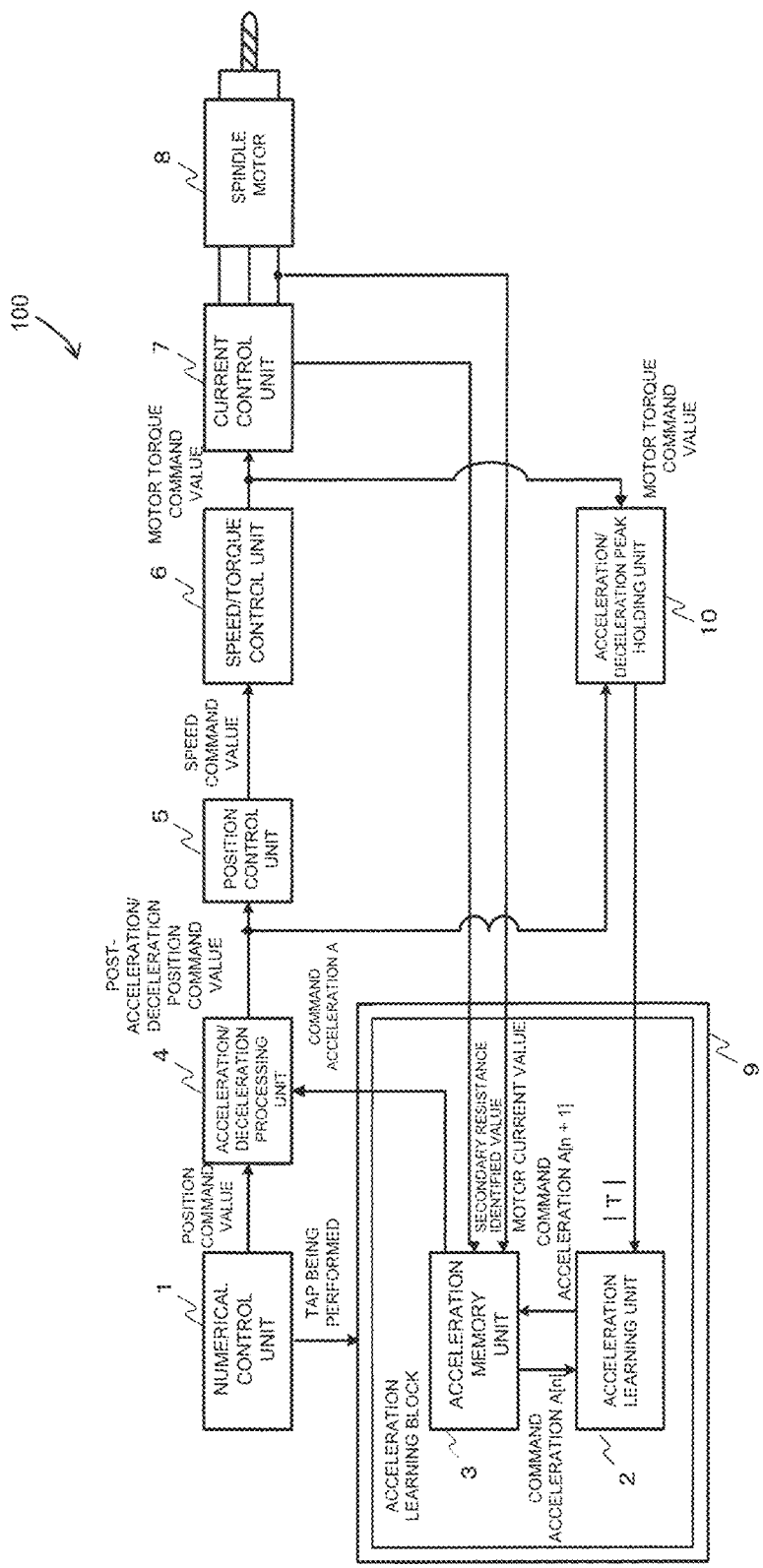
FIG. 1 is a block diagram of a numerical control apparatus for a machine tool according to an embodiment.

Referring to FIG. 1, the numerical control apparatus 100 includes a numerical control unit 1, an acceleration/deceleration processing unit 4, a position control unit 5, a speed/torque control unit 6, a current control unit 7, a spindle motor 8, an acceleration learning block 9, and an acceleration/deceleration peak holding unit 10. The spindle motor 8 is an induction motor.

The numerical control unit 1 interprets a tapping program and outputs a position command value to the acceleration/deceleration processing unit 4. Simultaneously, the numerical control unit 1 informs the acceleration learning block 9 that tapping is being performed. The acceleration/deceleration processing unit 4, based on a command acceleration A of a spindle input from the acceleration learning block 9, accelerates or decelerates, that is, adjusts the speed of, the position command value input from the numerical control unit 1, and outputs a post-acceleration/deceleration position command value to the position control unit 5. The position control unit 5 calculates a speed command value according to feedback control of the post-acceleration/deceleration position command value and a motor position and outputs the speed command value to the speed/torque control unit 6. The speed/torque control unit 6 then calculates a motor torque command value according to feedback control of the speed command value and a motor speed and outputs the motor torque command to the current control unit 7.

The current control unit 7 includes a secondary resistance identified unit that calculates a secondary resistance identified value of the spindle motor 8. The current control unit 7 calculates a slip frequency by using the calculated secondary resistance identified value. The current control unit 7 then outputs the calculated slip frequency to the spindle motor 8, and also calculates a motor current command value from the motor torque command value and causes electric current of the calculated current command value to flow in the spindle motor 8. As such, the current control unit 7 drives the spindle motor 8 to control the position of the spindle.

The acceleration/deceleration peak holding unit 10, based on the post-acceleration/deceleration position command value input from the acceleration/deceleration processing unit 4 and the motor torque command value input from the speed/torque control unit 6, determines stop, acceleration, constant speed, or deceleration from the post-acceleration/deceleration position command value, and detects and outputs to the acceleration learning block 9 a peak value |T| of the motor torque command value in the acceleration and deceleration states.

The acceleration learning block 9 includes an acceleration learning unit 2 and an acceleration memory unit 3. The acceleration learning unit 2, based on a target motor torque command value Tg, the peak value |T| of the motor torque command value input from the acceleration/deceleration peak holding unit 10, and a command acceleration A[n] for current tapping, which is input from the acceleration memory unit 3, calculates and outputs to the acceleration memory unit 3, a command acceleration A[n+1] for the next tapping, by using the following equation (1):

$$A[n+1]=A[n]+A[n]\times(Tg-|T|)\times\alpha \quad (1)$$

The command acceleration A[n+1] is an absolute value of acceleration or deceleration. The peak value |T| of the motor torque command value is also an absolute value. Further, α represents a convergence factor, which satisfies the relationship of 0<α≤1, and is an adjusting parameter for avoiding an excessive synchronization error alarm generated when the peak value |T| exceeds the target motor torque command value Tg. Desirably, α is about 0.25 (converges after four iterations).

The acceleration memory unit 3 stores the command acceleration A[n+1] for the next tapping calculated by the acceleration learning unit 2, and outputs, at the next tapping, the command acceleration A[n+1] to the acceleration/deceleration processing unit 4 as the command acceleration A of the spindle.

The acceleration memory unit 3 further stores, in addition to the command acceleration A[n+1] calculated by the acceleration learning unit 2 according to the equation (1), an initial command acceleration A[0] which is smaller than the calculated command acceleration A[n+1].

When changing windings of the spindle motor 8 or when the spindle motor 8 is not revolved, the spindle motor 8 is not energized so that the motor current value is 0. In revolving the spindle motor 8 in a state where the motor current value is 0, the field current value increases from 0. For a period from time 0 to a time several hundred msec after the field current starts to flow, the field current is insufficient and the magnetic flux is not stable, so that the outputtable maximum torque of the spindle motor 8 decreases. Therefore, if the spindle motor 8 is accelerated or decelerated with high command acceleration, the spindle motor 8 would not be able to follow the control, resulting in an increase in a synchronization error between the spindle and the feed axis to thereby increase the machining error.

To address the above disadvantage, when the motor current value calculated by the current control unit 7 is 0, the acceleration memory unit 3 outputs, as a command acceleration A, the initial command acceleration A[0] which is smaller than the command acceleration A[n+1] calculated by the acceleration learning unit 2 to the acceleration/deceleration processing unit 4.

Further, when the secondary resistance identified value, which is a circuit constant of the spindle motor 8, significantly deviates from the optimal value, such as when resuming machining in a state where the temperature of the spindle motor 8 is lowered, the outputtable maximum torque may be decreased. In this case, as in the above case, if the spindle motor 8 is accelerated or decelerated with high command acceleration, the spindle motor 8 would not be able to follow the control, resulting in an increase in the synchronization error between the spindle and the feed axis to thereby increase the machining error.

To address this disadvantage, when the secondary resistance identified value is equal to or greater than a predetermined threshold value, the acceleration memory unit 3 outputs, as a command acceleration A, the initial command acceleration A[0] which is smaller than the command acceleration A[n+1] calculated by the acceleration learning unit 2 to the acceleration/deceleration processing unit 4.

The predetermined threshold value may be a resulting secondary resistance identified value which is converged when the spindle motor 8 is driven in a low temperature state, or a value which is preset by test, for example. The predetermined threshold value is a parameter which is determined at the time of evaluation of the spindle motor 8 or servo adjustment.

As described above, the acceleration memory unit 3 determines, based on the motor current value or the secondary resistance identified value, which is a state quantity of the spindle motor 8, whether or not to output, as the command acceleration A, the initial command acceleration A[0], which is smaller than the command acceleration A[n+1] calculated by the acceleration learning unit 2, to the acceleration/deceleration processing unit 4.

Figure 2:
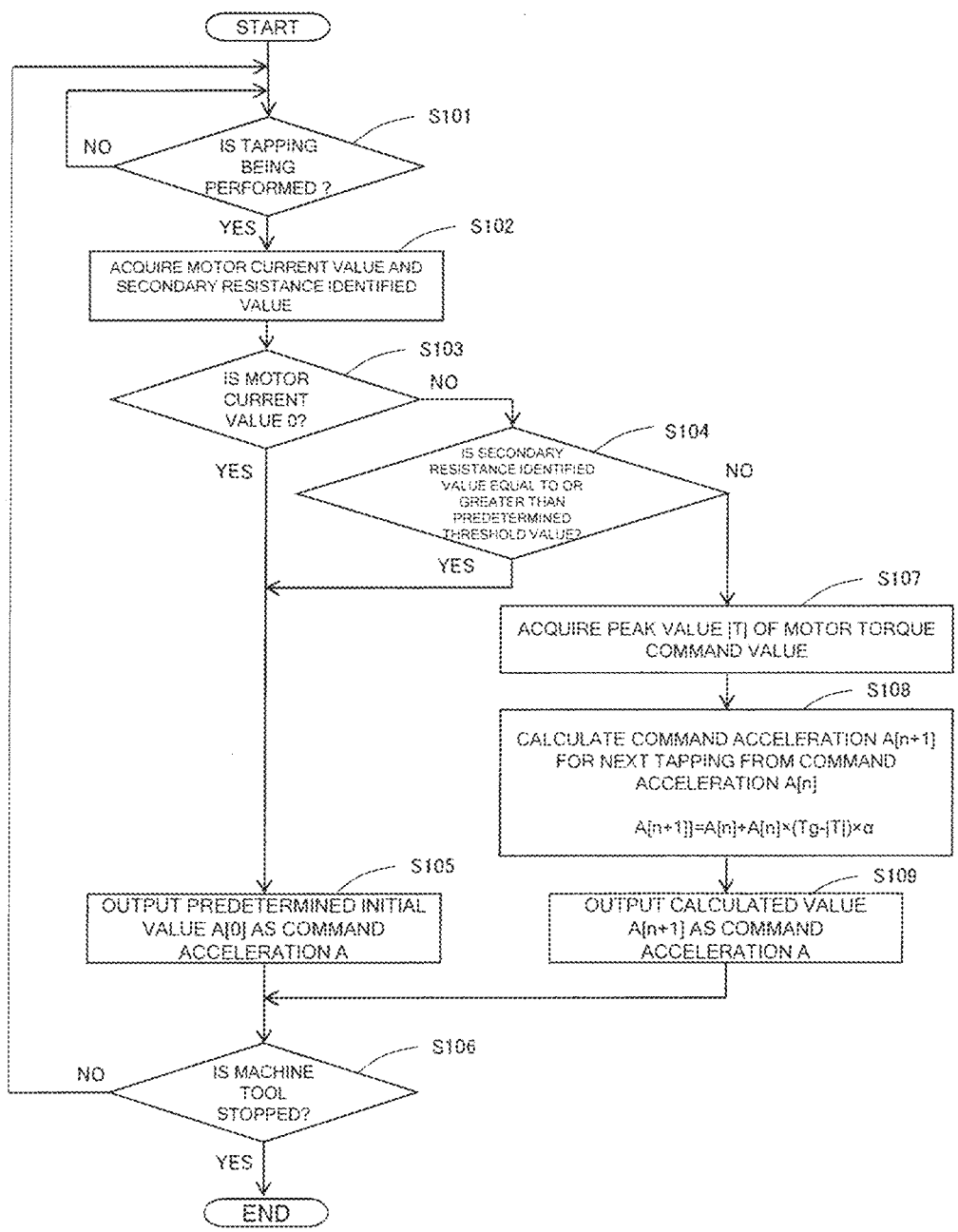
FIG. 2 is a flowchart showing operations of the numerical control apparatus illustrated in FIG. 1.

Referring now to FIG. 2, the operation of the acceleration learning block 9 of the numerical control apparatus 100 according to the embodiment will be described.

As shown in steps S101 to S102 in FIG. 2, the acceleration learning block 9 remains in a standby state until a signal indicating "tapping being performed" is input from the numerical control unit 1.

If YES is determined in step S101 in FIG. 2, the process proceeds to step S102 in FIG. 2 where the acceleration learning block 9 acquires the motor current value and the secondary resistance identified value calculated by the current control unit 7 from the acceleration memory unit 3, and the process further proceeds to step S103 in FIG. 2. The acceleration learning block 9 then determines whether or not the motor current value is 0 in step S103. If YES is determined in step S103, the process proceeds to step S105 where the acceleration learning block 9 outputs, as the command acceleration A, the initial command acceleration A[0], which is smaller than the command acceleration A[n+1] calculated by the acceleration learning unit 2, to the acceleration/deceleration processing unit 4.

The process further proceeds to step S106 where the acceleration learning block 9 determines whether or not the machine tool has stopped. If YES is determined in step S106, the acceleration learning block 9 terminates the process. If NO is determined in step S106, the process returns to step S101.

If NO is determined in step S103, the process proceeds to step S104 where the acceleration learning block 9 determines whether or not the secondary resistance identified value is equal to or greater than a predetermined threshold value. If YES is determined in step S104, the process proceeds to step S105 where the acceleration learning block 9 outputs, as the command acceleration A, the initial command acceleration A[0] which is smaller than the command acceleration A[n+1] calculated by the acceleration learning unit 2 to the acceleration/deceleration processing unit 4. The process then proceeds to step S106, and the acceleration learning block 9 terminates the process if YES is determined in step S106 and the process returns to step S101 if NO is determined in step S106, as described above.

If NO is determined in step S104, the process proceeds to step S107 where the acceleration learning block 9 acquires the peak value |T| of the motor torque command value calculated by the acceleration/deceleration peak holding unit 10 from the acceleration learning unit 2, and the process proceeds to step S108. In step S108, the acceleration learning block 9 calculates and outputs to the acceleration memory unit 3 the command acceleration A[n+1] for next tapping from the target motor torque command value Tg, the peak value |T| of the motor torque command value input by the acceleration/deceleration peak holding unit 10, and the command acceleration A[n] for current tapping input from the acceleration memory unit 3, according to the equation (1) described above. The acceleration learning block 9 stores the command acceleration A[n+1] for next tapping in the acceleration memory unit 3, and the process proceeds to S109.

In step S109, the acceleration learning block 9 outputs, as the command acceleration A, the command acceleration A[n+1] for next tapping stored in the acceleration memory unit 3 to the acceleration/deceleration processing unit 4, and the process proceeds to step S106.

As described above, if YES is determined in step S106, the acceleration learning block 9 terminates the process, and if NO is determined in step S106, the process returns to step S101.

As described above, the numerical control apparatus 100 according to the embodiment sets the command acceleration A to be smaller than the command acceleration A[n+1] calculated by acceleration learning unit 2, when tapping is started in a state where the spindle motor 8 is actuated with the motor current value being 0 so that the magnetic flux is unstable and the outputtable maximum torque is decreased or in a state where the secondary resistance identified value of the spindle motor 8 is equal to or greater than the predetermined threshold value and significantly deviates from the optimal value, such as at the time of start-up at low-temperatures. This structure inhibits an increase in the synchronization error between the spindle and the feed axis due to inability of the spindle motor 8 to follow the control to thus increase the machining error, when the outputtable maximum torque of the spindle motor 8 is decreased.

During tapping, the command acceleration A[n] for current tapping and the convergence factor $\alpha$ ($0<\alpha\leq1$) are multiplied by a difference between the target motor torque command value Tg and the peak value |T| of the motor torque command value, and the multiplication result is added to the command acceleration A[n] shown as the equation (1), thereby converging the command acceleration A to the target motor torque command value Tg. This can inhibit the peak value |T| from exceeding the target motor torque command value Tg to increase the synchronization error between the spindle and the feed axis and increase the machining error. It is also possible to converge the command acceleration A to the target motor torque command value Tg to thereby perform high speed tapping.

As such, the numerical control apparatus 100 according to the embodiment reduces the synchronization error to thereby reduce the machining error in a machine tool that performs tapping with the spindle and the feed axis being synchronized with each other. The numerical control apparatus 100 according to the embodiment can also perform high-speed and high-precision tapping.

In the above example, the numerical control apparatus 100 determines whether or not the motor current value is 0 and then refers to the secondary resistance identified value if the motor current value is not 0. However, the numerical control apparatus 100 may use either one of the motor current value or the secondary resistance identified value to determine whether or not the initial command acceleration A[0] which is smaller than the command acceleration A[n+1] calculated by the acceleration learning unit 2 is to be output, as the command acceleration A, to the acceleration/deceleration processing unit 4.

Figure 3:
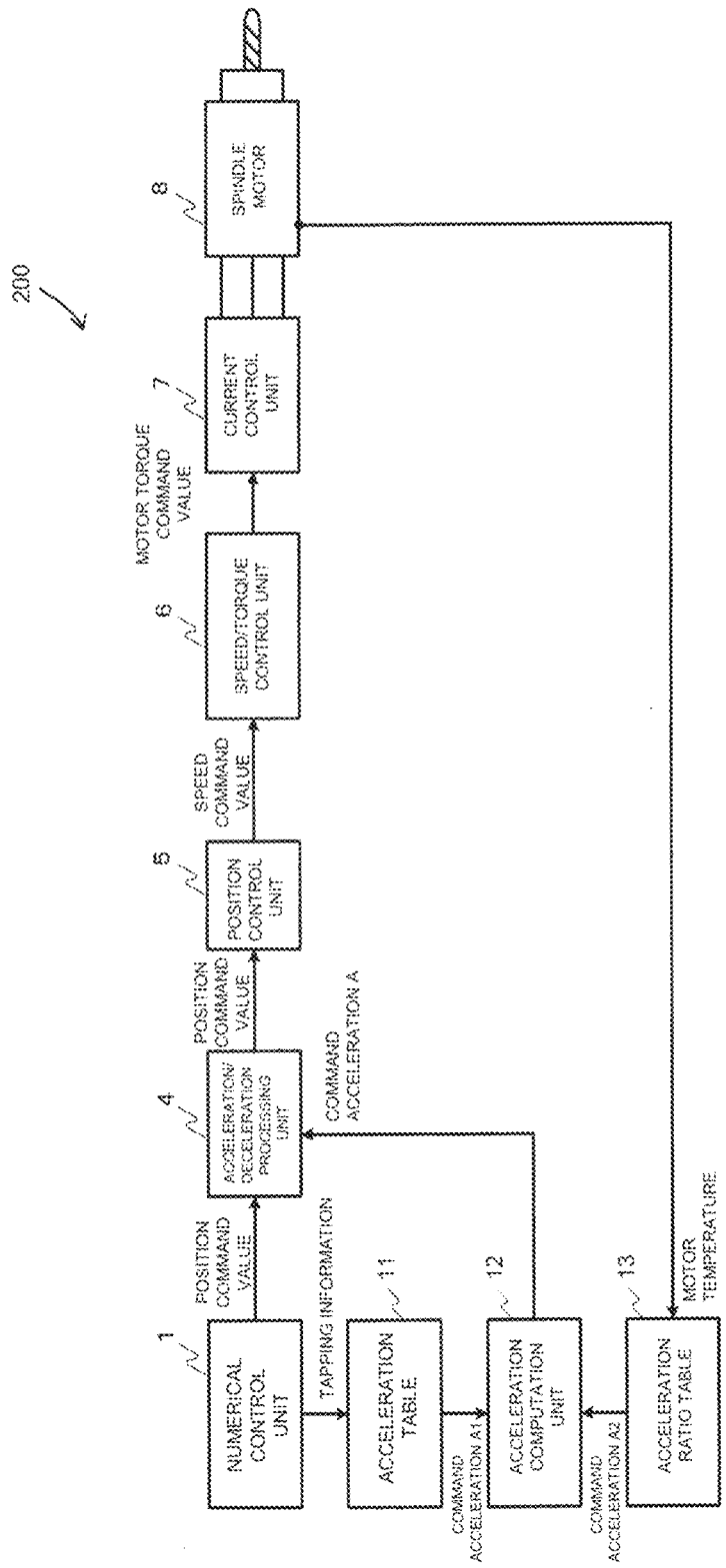
FIG. 3 is a block diagram of a related art numerical control apparatus for a machine tool.

Referring to FIG. 3, a numerical control apparatus 200 of the related art will be described as a comparative example of the numerical control apparatus 100 according to the embodiment. Elements of the numerical control apparatus 200 illustrated in FIG. 3 that are similar to those in the numerical control apparatus 100 described above with reference to FIG. 1 and FIG. 2 are denoted by similar reference numerals and will be not described.

As illustrated in FIG. 3, the numerical control apparatus 200 of related art includes an acceleration table 11, an acceleration computation unit 12, and an acceleration ratio table 13. The acceleration table 11 stores, as a table, command accelerations in accordance with tapping types and tool diameters, for example.

The acceleration table 11, based on tapping information input from the numerical control unit 1, selects a command acceleration A1 that is optimal for the tapping and outputs the selected command acceleration A1 to the acceleration computation unit 12. The acceleration ratio table 13 stores, in a table, acceleration ratios A2 that define reduction ratios of accelerations corresponding to input temperatures of the spindle motor 8. The acceleration ratio table 13, based on the input temperature of the spindle motor 8, reads a corresponding acceleration ratio A2 from the table and outputs the corresponding acceleration ratio A2 to the acceleration computation unit 12. For example, the lower the temperature of the spindle motor 8, the smaller the acceleration ratio A2.

The acceleration computation unit 12 multiplies the command acceleration A1 input from the acceleration table 11 by the acceleration ratio A2 input from the acceleration ratio table 13 to calculate the command acceleration A, and outputs the command acceleration A to the acceleration/deceleration processing unit 4.

The lower the temperature of the spindle motor 8, the smaller the acceleration ratio A2, for example. Therefore, as the temperature of the spindle motor 8 is lowered, the command acceleration A output to the acceleration/deceleration processing unit 4 becomes smaller.

As described above, the numerical control apparatus 200 performs control to set the command acceleration A smaller as the temperature of the spindle motor 8 becomes lower. However, in a state where the magnetic flux of the spindle motor 8 is not stable to decrease the outputtable maximum torque, or in a state where the secondary resistance identified value significantly deviates from the optimal value to decrease the outputtable maximum torque, the above control method fails to allow the spindle motor 8 to follow the control even by setting the command acceleration A small based on the temperature of the spindle motor 8. This may increase the synchronization error between the spindle and the feed axis, to thereby increase the machining error.

In contrast, the numerical control apparatus 100 according to the embodiment determines, based on the motor current value, whether or not the magnetic flux of the spindle motor 8 is unstable so that the outputtable maximum torque is decreased, and determines, based on the secondary resistance identified value of the spindle motor 8, whether or not the secondary resistance identified value deviates significantly from the optimal value so that the outputtable maximum torque is decreased. The numerical control apparatus 100 then outputs, based on this determination, the initial command acceleration A[0] which is smaller than the command acceleration A[n+1] calculated by the acceleration learning unit 2, as the command acceleration A, to the acceleration/deceleration processing unit 4. This structure inhibits an increase in the synchronization error between the spindle and the feed axis and an increase in the machining error, caused by inability of the spindle motor 8 to follow the control in a state where the outputtable maximum torque of the spindle motor 8 is decreased.

As described above, the numerical control apparatus 100 according to the embodiment can reduce the synchronization error between the spindle and the feed axis to thereby reduce the machining error in a machine tool that performs tapping with the spindle and the feed axis being synchronized with each other.

The invention claimed is:

1. A numerical control apparatus for a machine tool that performs tapping with a spindle and a feed axis being synchronized with each other, the numerical control apparatus comprising:
   a numerical control circuit that interprets a tapping program and outputs a position command value of the spindle;
   an acceleration learning circuit that calculates and outputs a command acceleration of the spindle during tapping;
   an acceleration/deceleration processing circuit that applies an acceleration/deceleration process to the position command value input from the numerical control circuit based on the command acceleration input from the acceleration learning circuit to calculate a post-acceleration/deceleration position command value;
   a position control circuit that calculates a speed command value based on the post-acceleration/deceleration position command value input from the acceleration/deceleration processing circuit;
   a speed/torque control circuit that calculates a motor torque command value from the speed command value input from the position control circuit; and
   a current control circuit that calculates a motor current command value of a spindle motor from the motor torque command value input from the speed/torque control circuit, wherein the current control circuit causes electric current of the current command value, which is calculated based on both the position command value of the spindle output from the numerical control circuit and the command acceleration calculated in the acceleration learning circuit, to flow in the spindle motor to control a position of the spindle motor so that a synchronization error of the feed spindle and the feed axis is reduced and a tapping machining error is accordingly decreased;
   wherein the acceleration learning circuit outputs:
      an initial command acceleration, which is smaller than a calculated command acceleration for a next tapping, as the command acceleration, in response to determining that one or more state quantities of the spindle motor satisfies a condition, to the acceleration/deceleration processing circuit, and
      the calculated command acceleration for the next tapping, as the command acceleration, in response to determining that the one or more state quantities of the spindle motor does not satisfy the condition as the command acceleration, wherein the command acceleration for next tapping is calculated as A[n+1] using a target motor torque command value Tg, a peak value |T| of the motor torque command value, a command acceleration A[n] for present tapping, and a convergence factor α by a following equation (1):

$$A[n+1]=A[n]+A[n]\times(Tg-|T|)\times\alpha \quad (1),\text{ and}$$

wherein the convergence factor satisfies a relationship of 0<α≤1.

2. The numerical control apparatus according to claim 1, wherein,
   the one or more state quantities of the spindle motor includes the motor current command value calculated by the current control circuit, and
   the acceleration learning circuit outputs, as the command acceleration, the initial command acceleration to the acceleration/deceleration processing circuit, when the motor current command value is 0.

3. The numerical control apparatus according to claim 2,
   the one or more state quantities of spindle motor further includes a secondary resistance identified value of the spindle motor calculated by the current control circuit, and
   the acceleration learning circuit outputs, as the command acceleration, the initial command acceleration to the acceleration/deceleration processing circuit, when the secondary resistance identified value is equal to or greater than a predetermined threshold value.

4. The numerical control apparatus according to claim 1, wherein
   the one or more state quantities of the spindle motor includes a secondary resistance identified value of the spindle motor calculated by the current control circuit, and
   the acceleration learning circuit outputs, as the command acceleration, the initial command acceleration to the acceleration/deceleration processing circuit, when the secondary resistance identified value is equal to or greater than a predetermined threshold value.

5. A numerical control method for a machine tool that performs tapping with a spindle and a feed axis being synchronized with each other, the numerical control method comprising:
   interpreting a tapping program and outputting a position command value of the spindle;
   calculating a command acceleration of the spindle during tapping;
   applying an acceleration/deceleration process to the position command value based on the calculated command acceleration to calculate a post-acceleration/deceleration position command value;
   calculating a speed command value based on the calculated post-acceleration/deceleration position command value;
   calculating a motor torque command value from the speed command value; and
   calculating a motor current command value of a spindle motor from the calculated motor torque command value,
   causing electric current of the motor current command value, which is calculated based on both the position command value and the spindle and the command acceleration of the spindle, to flow in the spindle motor to control a position of the spindle so that a synchronization error of the feed spindle and the feed axis is reduced and a tapping machining error is accordingly decreased;
   wherein the calculating a command acceleration of the spindle during tapping comprises, using an initial command acceleration, which is smaller than a calculated command acceleration for a next tapping, as the command acceleration in response to determining that one or more state quantities of the spindle motor satisfy a condition, and
   using the calculated command acceleration for the next tapping, as the command acceleration, in response to determining that the one or more state quantities of the spindle motor do not satisfy the condition, wherein the command acceleration for next tapping is calculated as A[n+1] using a target motor torque command value Tg, a peak value |T| of the motor torque command value, a command acceleration A[n] for present tapping, and a convergence factor α by a following equation (1):

$$A[n+1]=A[n]+A[n]\times(Tg-|T|)\times\alpha \quad (1),$$

and wherein the convergence factor satisfies a relationship of $0<\alpha\leq 1$.

6. The numerical control method according to claim 5,
wherein the one or more state quantities of the spindle motor is the motor current command value, and
wherein the initial command acceleration is used as the command acceleration when the motor current command value is 0.

7. The numerical control method according to claim 6,
wherein the one or more state quantities of spindle motor is a secondary resistance identified value of the spindle motor, and
wherein the initial command acceleration is used as the command acceleration when the secondary resistance identified value is equal to or greater than a predetermined threshold value.

8. The numerical control method according to claim 5,
wherein the one or more state quantities of the spindle motor is a secondary resistance identified value of the spindle motor, and
wherein the initial command acceleration is used as the command acceleration when the secondary resistance identified value is equal to or greater than a predetermined threshold value.

* * * * *